J. T. NEELEY.
POST MOLD.
APPLICATION FILED SEPT. 14, 1910.
1,018,072.
Patented Feb. 20, 1912.
2 SHEETS—SHEET 2.
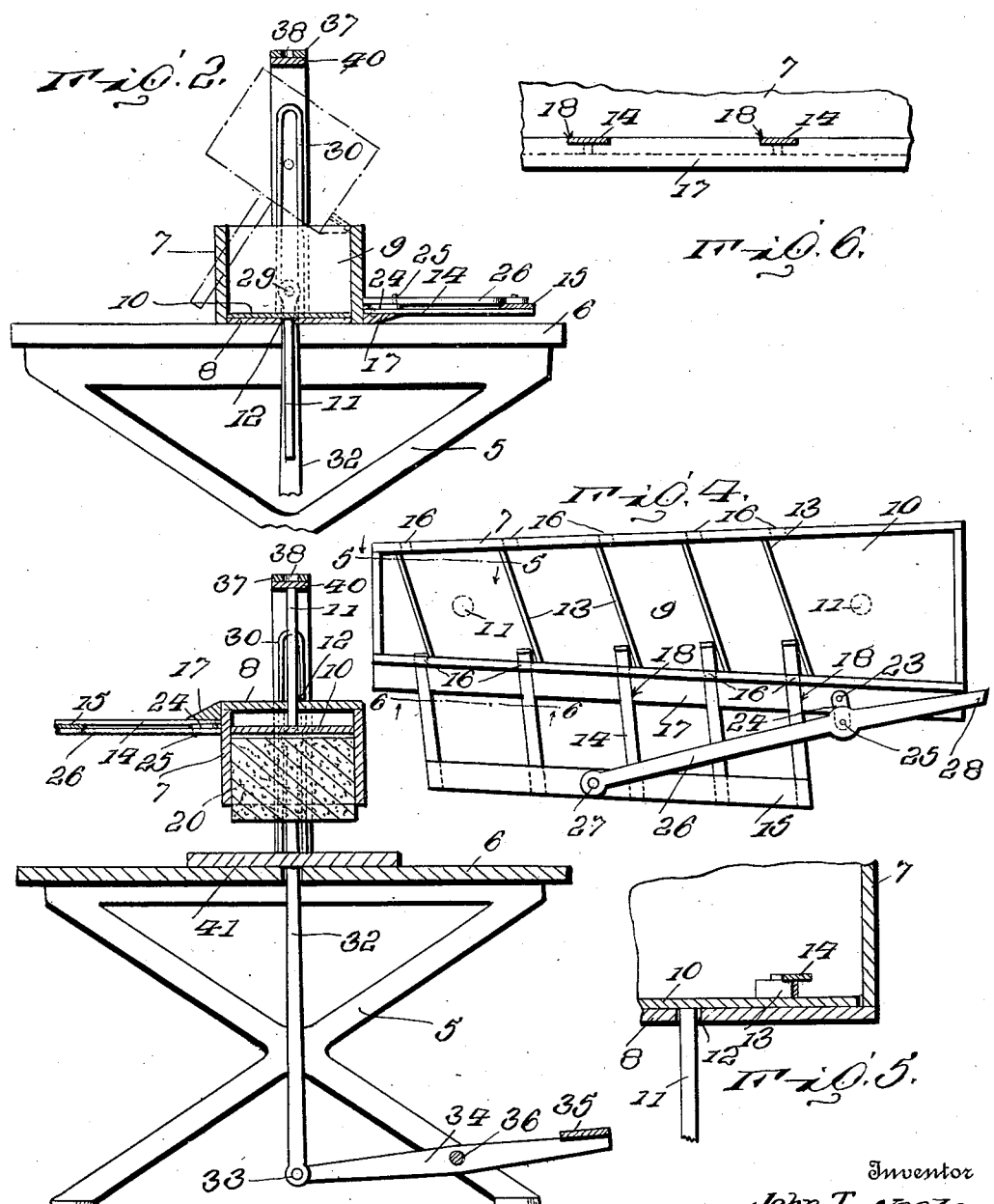
Witnesses
W. N. Woodson
Juana M. Fallin
Inventor
John T. Neeley
By
Attorneys

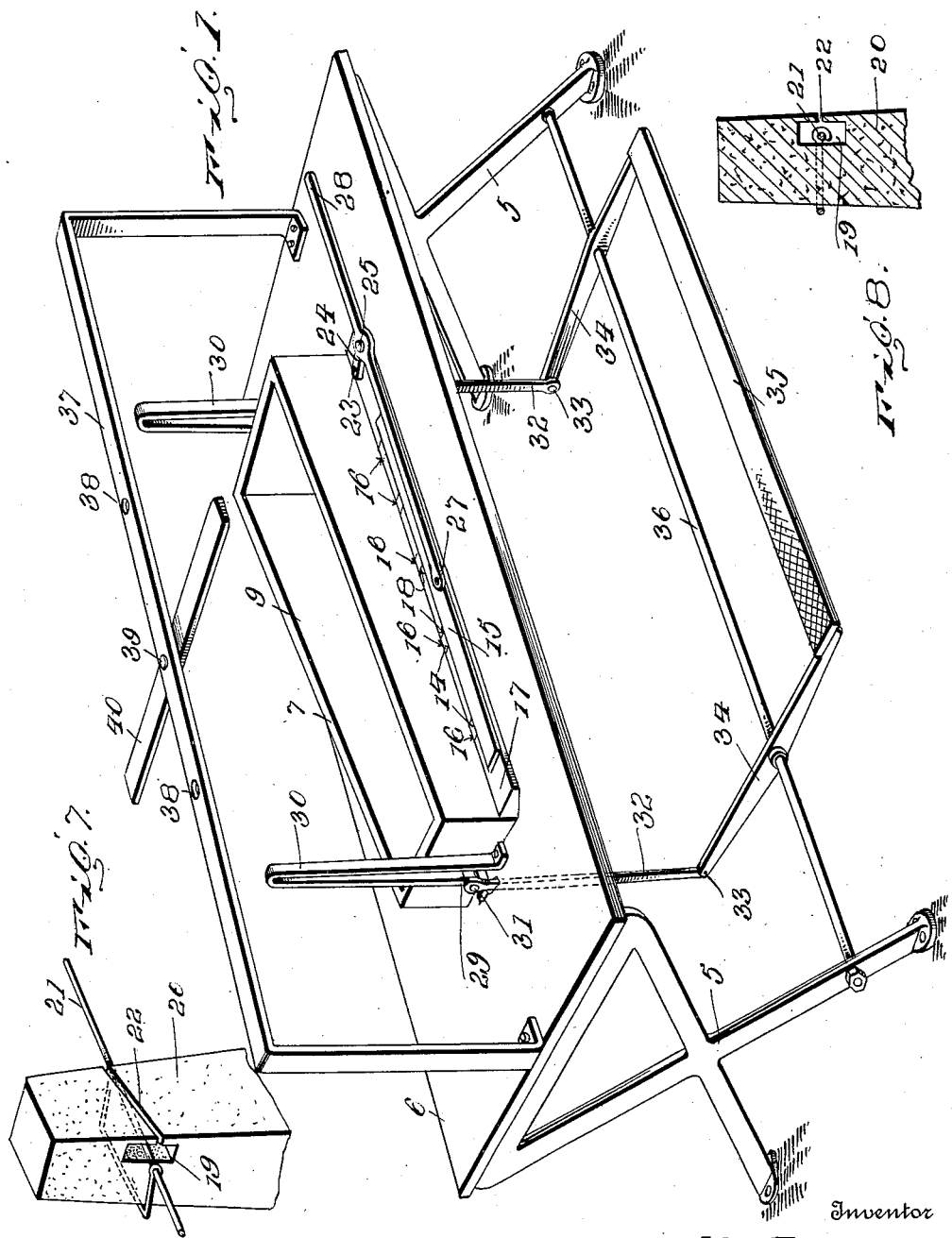

UNITED STATES PATENT OFFICE.

JOHN T. NEELEY, OF CHESTERTON, INDIANA.

POST-MOLD.

1,018,072.  Specification of Letters Patent.  Patented Feb. 20, 1912.

Application filed September 14, 1910. Serial No. 582,087.

*To all whom it may concern:*

Be it known that I, JOHN T. NEELEY, citizen of the United States, residing at Chesterton, in the county of Porter and State of Indiana, have invented certain new and useful Improvements in Post-Molds, of which the following is a specification.

This invention relates to machines for making fence posts from cement, concrete or other plastic material and has for its object the provision of a molding machine of simple and durable construction, by means of which artificial stone posts may be conveniently and expeditiously manufactured.

A further object is to provide a molding machine, the construction of which is such as to form the post with a plurality of spaced transverse seating recesses having diagonal slots communicating therewith to permit the insertion of line wires.

A further object is to provide a mold having a follower arranged therein and provided with stationary slot forming ribs, there being suitable cores arranged on one side of the mold and movable to operative position within the latter above said ribs.

A further object is to provide means for elevating the mold, means for reversing said mold, and means for actuating the follower to discharge the molded product.

A still further object of the invention is generally to improve this class of machines, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a fence post molding machine constructed in accordance with my invention; Fig. 2 is a transverse sectional view, showing in full lines the mold supported on the table, and the movable cores retracted, and in dotted lines, the mold partially elevated and in position to be reversed; Fig. 3 is a similar view, showing the mold reversed and the follower in the act of ejecting the molded product; Fig. 4 is a top plan view of the mold detached from the supporting frame, showing the manner of operating the movable cores; Fig. 5 is a detail vertical sectional view taken on the line 5—5 of Fig. 4, showing the position of the movable cores with respect to the stationary ribs prior to introducing the cement or other plastic material within the mold; Fig. 6 is a detail transverse sectional view taken on the line 6—6 of Fig. 4; Fig. 7 is a detail perspective view of a portion of a post made with the mold, showing a line wire in position thereon. Fig. 8 is a vertical sectional view of Fig. 7.

Corresponding and like parts are referred to in the following description and indicated in all the views of the drawings by the same reference characters.

The improved molding machine forming the subject matter of the present invention comprises a supporting frame including end pieces or legs 5 on which is supported in any suitable manner a table or platform 6. Resting on the table 6, is a mold 7 preferably tapered, as shown, and having its upper end open and its lower end closed by a bottom plate 8.

Slidably mounted within the molding compartment 9, and normally resting on the bottom plate 8, is a follower 10 having spaced depending pins 11, which latter extend through correspondingly shaped openings 12 in the plate 8 and table 6, and serve to prevent accidental displacement of the mold during the molding operation. Fastened in any suitable manner on the upper surface of the follower 10 are spaced inclined slot forming ribs 13 which coact with movable cores 14 fastened to a bar 15 on one side of the mold 7, as best shown in Fig. 4 of the drawings.

The side walls of the mold 7 are formed with oppositely disposed openings 16 to permit the passage of the movable cores 14, there being a plate 17 secured to one of the side walls of the mold and provided with grooves 18 to assist in guiding the cores 14 when the latter are moved to operative and inoperative positions. The cores 14 are movable to operative position within the molding compartment 9, above and in contact with the ribs 13, thus to produce a plurality of seating recesses 19 in the molded product or post 20 for the reception of line wires 21, and inclined slots 22 intersecting said recesses to permit the insertion and removal of said line wires, as best shown in Fig. 7 of the drawings.

Pivotally mounted at 23 on the bar or support 17, is one end of a link 24, the opposite end of which is pivotally mounted at 25 on the intermediate portion of an operating lever 26. One end of the operating lever 26 is pivotally mounted at 27 on the longitudinal bar 15, while the other end thereof terminates in a handle 28, so that by operating said handle, the cores 14 may be moved within the mold to a position above and in contact with the ribs 13 and retracted when it is desired to discharge the molded product. Extending laterally from the opposite ends of the mold 7 are pins or trunnions 29 which operate within suitable loops or guides 30 secured to the upper surface of the table 6.

Pivotally mounted at 31 on the pins 29 are short levers or links 32, the lower ends of which are pivotally connected at 33 with the adjacent rock bars 34 of a foot lever or treadle 35. The rock bars 34 are pivotally mounted on a longitudinal rod 36 connecting the end pieces or legs 5 so that by depressing the foot piece 35, the mold 7 may be elevated above the surface of the table or platform, as will be more fully described hereinafter.

Secured to the table 6 at the opposite ends of the supporting frame, is an auxiliary frame or yoke 37 having spaced openings 38 formed therein to permit the passage of the pins 11 when the mold is reversed and elevated to permit the removal of the molded product. Pivotally mounted at 39 on the yoke 37, is a bar 40 adapted to form a closure for the openings 38 so as to prevent the pins 11 from passing therethrough and thus cause the follower 10 to eject the molded product when the mold is elevated.

In operation, the mold is partially filled with concrete or other plastic material, and the latter thoroughly tamped, after which the handle 38 is actuated to move the cores 14 into the molding compartment 9, more concrete being then placed in the mold and tamped. The treadle 35 is then depressed which elevates the mold above the surface of the table so as to permit said mold to be swung in the arc of a circle on the trunnions 29 to reversed position, as best shown in Fig. 2 of the drawings. The movable cores 14 are then withdrawn from the compartment 9 and a pallet 41 placed on the table above the mold, after which a further downward movement is imparted to the treadle 35 causing the pins 11 to bear against the bar 40 and force the follower 10 downwardly to eject the molded product and deposit the latter on the pallet 41, as best shown in Fig. 3 of the drawings. The treadle 35 is then released so as to disengage the pins from the bar 40, and said bar swung laterally on the pivot pin 39 so as to expose the openings 38, after which the treadle 35 is again depressed which permits the pins to pass through the openings 38 and thus allow the mold 7, together with the follower, to be raised sufficiently above the molded product to permit the post to be removed from the table on the pallet 41 and carried to the drying racks until sufficiently hardened for use. After the post has been removed from the table 6, the mold 7 is lowered a short distance and rotated on the trunnions 29 so that said mold may be placed in position on the table, bottom end down, and in which position, the mold is again ready to be filled.

It will of course be understood that the molds may be made in different sizes and shapes so as to permit the construction of different styles of fence posts, and that any number of ribs and movable cores may be provided according to the number of line or strand wires to be supported on the post.

From the foregoing description, it is thought that the construction and operation of the device, will be readily understood by those skilled in the art, and further description thereof is deemed unnecessary.

Having thus described the invention, what is claimed as new is:

1. A machine of the class described including a supporting frame and table, a mold supported on the table and provided with trunnions, a follower operating within the mold and having one face thereof provided with fixed inclined ribs, cores movable to operative position within the mold and diagonally across the upper edges of the adjacent ribs, a treadle, and links forming a pivotal connection between the treadle and trunnions for elevating the mold above the surface of the table when the treadle is depressed.

2. A machine of the class described including a supporting frame and table, a movable mold supported on the table, a follower operating within the mold and provided with depending pins extending through the table, fixed ribs secured to one face of the follower and extending the entire width of the latter, cores co-acting with the ribs and movable to operative position diagonally across and in contact with the faces of said ribs, means operatively connected with the mold for elevating the latter, means for reversing the mold, and means for discharging the molded product when said mold is reversed.

3. A machine of the class described including a supporting frame and table a movable mold normally resting on the table, an auxiliary frame, a follower operating within the mold and provided with depending pins extending through said table, means for elevating the mold, and means for reversing the mold, said pins being adapted to bear against the auxiliary frame and eject the molded product when the mold is reversed.

4. A machine of the class described including a supporting frame and table a reversible mold normally resting on the table, a follower operating within the mold and provided with spaced depending pins extending through openings in the table, fixed ribs secured to one face of the follower and extending the entire width of the latter, cores, each movable to a position diagonally across and in contact with one longitudinal edge of the adjacent rib, an auxiliary frame having openings formed therein, a bar pivotally mounted on the auxiliary frame and adapted to normally close said openings, means for elevating the mold, and means for ejecting the molded product when said mold is reversed.

5. A machine of the class described including a supporting frame and table, a mold normally supported on the table, a follower operating within the mold and provided with depending pins projecting through said table, fixed ribs secured to the follower, an auxiliary frame having spaced openings formed therein, means for elevating the mold above the surface of the table, and a bar pivotally mounted on the auxiliary frame and adapted, when in one position to engage the pins and actuate the follower to eject the molded product, and when in another position, to permit the pins to extend through the openings in the auxiliary frame.

6. A machine of the class described including a supporting frame and table, guides secured to the upper surface of said table, a mold normally supported on the table and provided with laterally extending trunnions operating within said guides, a follower arranged within the mold and provided with pins extending through openings in the table, fixed ribs secured to the follower, movable cores co-acting with the ribs, a treadle, links forming a connection between the trunnions and treadle for elevating the mold, an auxiliary frame having openings therein, and a bar pivotally mounted on the auxiliary frame and adapted, when in one position to prevent vertical movement of the pins and when in another position to permit the pins to pass through said openings.

7. A machine of the class described including a supporting frame and table, a reversible mold normally supported on the table and having its upper end open and its lower end closed, a follower resting on the closed end of the mold and provided with pins extending through the bottom of the mold and said table, spaced inclined ribs rigidly secured to the upper surface of the follower, co-acting cores adapted to bear against the ribs, an auxiliary frame having openings formed therein, means for raising and lowering the mold, means independent of the mold elevating means for actuating the movable cores, and means pivotally mounted on the auxiliary frame and adapted, when in one position to form a stop for the pins and when in another position to permit the passage of the pins through the openings.

In testimony whereof, I affix my signature in presence of two witnesses.

JOHN T. NEELEY. [L. S.]

Witnesses:
FRANK J. TILLOTSON,
ROBT. A. NEELEY.

---

Copies of this patent may be obtained for five cents each, by addressing the "Commissioner of Patents, Washington, D. C."